United States Patent
Becker et al.

(10) Patent No.: US 8,620,500 B2
(45) Date of Patent: *Dec. 31, 2013

(54) METHOD AND DEVICE FOR DETERMINING LEARNED VALUES FOR CONTROLLING AN INTERNAL COMBUSTION ENGINE

(75) Inventors: Oliver Becker, Schriessheim (DE); Christoph Weisser, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 425 days.

This patent is subject to a terminal disclaimer.

(21) Appl. No.: 12/736,325

(22) PCT Filed: Dec. 5, 2008

(86) PCT No.: PCT/EP2008/066906
§ 371 (c)(1),
(2), (4) Date: Dec. 13, 2010

(87) PCT Pub. No.: WO2009/121435
PCT Pub. Date: Oct. 8, 2009

(65) Prior Publication Data
US 2011/0082608 A1      Apr. 7, 2011

(30) Foreign Application Priority Data
Apr. 1, 2008  (DE) .......................... 10 2008 000 911

(51) Int. Cl.
*B60K 6/48*  (2007.10)
*B60W 20/00*  (2006.01)

(52) U.S. Cl.
USPC ........................................... 701/22; 701/33.1

(58) Field of Classification Search
None
See application file for complete search history.

(56) References Cited

U.S. PATENT DOCUMENTS

| 6,009,371 | A  * | 12/1999 | Kobayashi ............... 701/112 |
| 8,029,408 | B2 * | 10/2011 | Seel ................................ 477/5 |
| 8,332,091 | B2 * | 12/2012 | Zeh et al. ................... 701/22 |
| 2002/0079149 | A1 | 6/2002 | Kotre et al. |
| 2009/0177365 | A1 | 7/2009 | Jung et al. |
| 2010/0106355 | A1* | 4/2010 | Hattori et al. ............... 701/22 |

FOREIGN PATENT DOCUMENTS

| CN | 101146985 | 3/2008 |
| CN | 101652538 | 2/2010 |
| DE | 43 12 586 | 10/1994 |
| DE | 43 12 587 | 10/1994 |
| DE | 103 05 523 | 8/2004 |
| DE | 10 2006 021 301 | 11/2007 |
| DE | 10 2006 027 405 | 12/2007 |
| JP | 2000-97069 | 4/2000 |
| JP | 2002-159105 | 5/2002 |
| JP | 2006-70743 | 3/2006 |
| JP | 2006-83734 | 3/2006 |
| JP | 2007-131103 | 5/2007 |
| JP | 2007-274840 | 10/2007 |
| WO | WO 2006/101253 | 9/2006 |

* cited by examiner

*Primary Examiner* — Michael J Zanelli
(74) *Attorney, Agent, or Firm* — Kenyon & Kenyon LLP

(57) ABSTRACT

A method for ascertaining learned values for controlling an internal combustion engine, a second drive unit, e.g., an electric motor, drags the internal combustion engine in a specific operating state, and the learned values are ascertained in this operating state.

6 Claims, 2 Drawing Sheets

METHOD AND DEVICE FOR DETERMINING LEARNED VALUES FOR CONTROLLING AN INTERNAL COMBUSTION ENGINE

BACKGROUND OF THE INVENTION

1. Field of the Invention

The present invention is directed to a device and a method for controlling a hybrid engine system having an internal combustion engine and a second drive unit.

2. Description of Related Art

Methods and devices for controlling an internal combustion engine in which a first drive unit in the form of an internal combustion engine and a second drive unit propel a vehicle are known from the related art. Such vehicles are customarily described as hybrid vehicles.

In order not to exceed current emission limit values, the measuring precision of the injection system of the internal combustion engine is subjected to stringent requirements over the entire life of the vehicle. Due to production spread of injectors, nozzle wear and nozzle plugging, these objectives are not able to be achieved without complex compensation strategies.

This requires the ascertainment of learned values in specific operating states such as overrun mode, the learned values being used for correcting various setpoint values. Such a correction is, for example, defined as a zero quantity calibration. This zero quantity calibration is used to ensure that the correct preinjection quantity is present over the life of the vehicle. This zero quantity calibration ascertains a minimum activating duration of the injectors, at which a predefined implementation of the injected fuel quantity by the engine occurs. This is detected in overrun mode when a defined rotational speed threshold is exceeded. Such a method is known, for example, from published German patent document DE 43 12 586.

It is problematic in this case that the internal combustion engine must usually be in the so-called overrun mode when the learned values are ascertained. In addition to overrun mode, additional boundary conditions must normally be present to be able to successfully ascertain the learned values. These additional boundary conditions include in particular an engine at operating temperature, a limited rotational speed range including a limited dynamic speed range and built up rail pressure.

Due to these problems, it is not ensured that the learned values will be learned until after a long travel distance, for example 3000 km. Therefore, the correct preinjection quantity is not metered until after this travel distance.

BRIEF SUMMARY OF THE INVENTION

The method according to the present invention has the advantage that it is possible to ascertain the learned values very quickly after a short travel distance. This in turn has the result that precise fuel metering is made possible.

The method according to the present invention is not limited to the ascertainment of the learned values in the zero quantity calibration. It is possible to implement the procedure in all methods in which learned values are ascertained in overrun mode, in particular correction values and/or adaptation values.

For example, the procedure may also be used for ascertaining the learned values of a sensor adapter. Based on tolerances in segmented wheel manufacturing, the teeth may not be at equal distances. To compensate for these tolerances, the deviations based on the sensor wheel tolerances are measured and taken into account in the subsequent control.

DETAILED DESCRIPTION OF THE INVENTION

Figure 1:
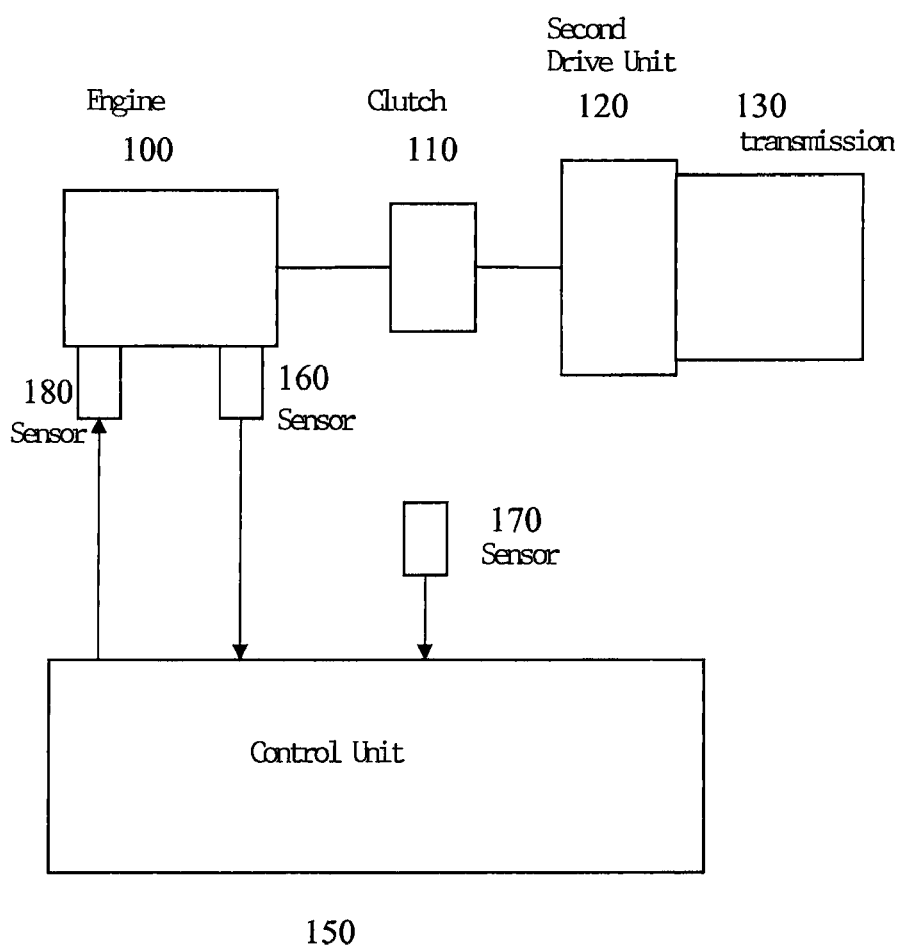
FIG. 1 shows the essential elements of a hybrid vehicle.

FIG. 1 shows the essential elements of one example embodiment of a hybrid vehicle. An internal combustion engine is denoted as 100, the internal combustion engine being connected to a second drive unit 120 via a clutch 110. Second drive unit 120 is connected to a transmission 130. Furthermore, a control unit 150 is provided. Control unit 150 processes signals from sensors 160, which are situated on the internal combustion engine, and from sensors 170 which detect the operating state of the vehicle or ambient conditions. Furthermore, actuators 180 that may be used to influence different variables of the internal combustion engine are provided. For example, an actuator that may be used to influence the point in time and/or the injected fuel quantity is provided. Furthermore, actuators that influence the quantity of air supplied to the internal combustion engine may be provided.

Normally, a variety of operating states are provided in a hybrid vehicle. If the internal combustion engine is running and clutch 110 connects the internal combustion engine to the second drive unit or to transmission 130, the internal combustion engine drives the transmission and accordingly the entire vehicle. In this case, the second drive unit is not normally in operation. Disengaging clutch 110 separates the internal combustion engine from the transmission. In this case, it is possible for the transmission and accordingly the vehicle to be driven via the second drive unit. In this case, the vehicle is driven by the second drive unit. This second drive unit is preferably in the form of an electric motor.

If the vehicle is braked, clutch 110 is disengaged and the transmission drives second drive unit 120 and the electric motor is operated as a generator. As a result, the generator feeds energy back into the energy source.

Clutch 110 is normally disengaged and the internal combustion engine is shut down when the vehicle is driven by second drive unit 120.

According to the present invention, in operating states in which learned values are to be ascertained, clutch 110 is engaged as long as the second drive unit drives the vehicle. This means that the second drive unit drags along the internal combustion engine in the specific operating states in which the learned values are ascertained. This means that internal combustion engine 100 is operated in an operating state corresponding to the customary overrun mode.

The design shown in FIG. 1 is an example embodiment of a hybrid vehicle. The method according to the present invention is not limited to this embodiment. It may be used in all hybrid systems in which the internal combustion engine is dragged along without injection when operated using the electric drive.

According to the present invention, the internal combustion engine is shifted into an artificial overrun mode using the second drive unit. The learned values are ascertained in this artificial overrun mode. During this artificial overrun mode, the vehicle is driven only by the second drive unit. The internal combustion engine does not contribute at all to the driving of the vehicle. In this operating state, the internal combustion engine is dragged along by the second drive unit.

This means that in operating states in which the electric drive provides the forward travel, the internal combustion engine is not decoupled but instead remains coupled and is driven by the electric machine. From the perspective of the internal combustion engine, the vehicle is accordingly in overrun, i.e., it is possible to ascertain the learned values in this driving mode.

It is advantageous in this connection that the learning frequency is drastically increased using this method and accordingly the learned values are learned at a significantly faster rate. A pure overrun mode is no longer necessary, as it is also possible for the learned values to be learned in low-load phases. Such low-load phases occur in particular when traveling at a constant speed in a city for short times and/or when traveling on a highway having a slight downhill grade.

The aforementioned method is preferably implemented when it is necessary for the learned values to be learned rapidly. This is in particular the case in new vehicles or after injectors have been replaced in the workshop. This method is advantageous in particular in vehicle applications in which overrun mode occurs very rarely. This is in particular the case in automatic transmission vehicles and in the case of drivers who regularly declutch soon after transition to overrun mode.

Figure 2:
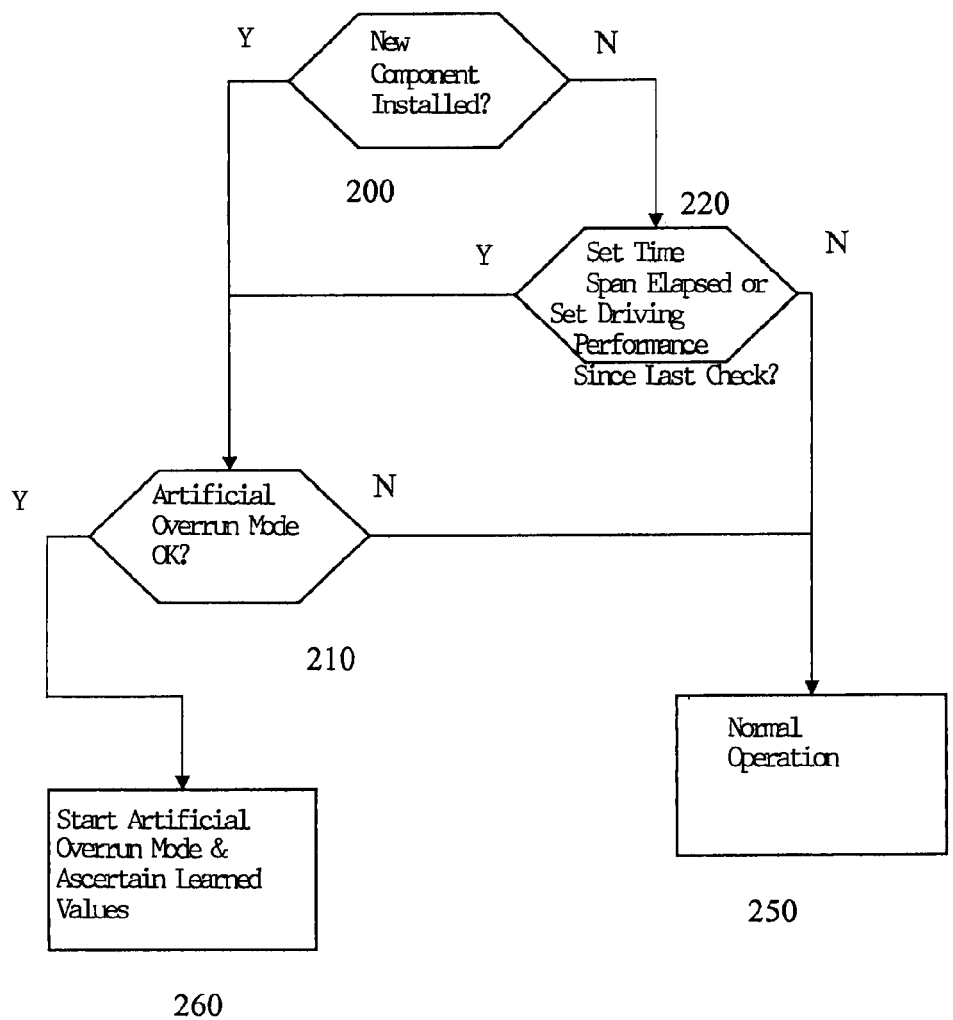
FIG. 2 shows a flow chart for describing the method according to the present invention.

An example of the method according to the present invention is shown in FIG. 2 in the form of a flow chart. A first query 200 checks if new components have been installed. This is in particular the case after a visit to a workshop or after delivery of the vehicle. If this is the case, query 210 follows.

If no new installation is detected in step 200, query 220 checks if a specific time span has elapsed since the last ascertainment of the learned values or if the vehicle produced a specific driving performance since the last ascertainment of the learned values. If this is the case, query 210 follows. Query 220 ensures that the learned values are ascertained at a specific interval. In particular, the learned values are ascertained at a fixed interval. The time interval is thus used as the interval or a check is performed to ascertain whether the vehicle has traveled a specific number of distances.

If query 220 detects that this interval has not been reached yet, normal operation takes place in step 250.

Query 210 checks if a driving mode is present in which the artificial overrun mode is able to be introduced. If this is not the case, the vehicle is operated in normal mode in step 250. If this is the case, artificial overrun mode is started in step 260 and the learned values are ascertained.

The described specific embodiment is only exemplary. It may also be provided that the electric motor drags the internal combustion engine along continuously. In this case, it is only checked if such a driving mode is present. If this is the case, the learned values are ascertained.

What is claimed is:

1. A method for operating a hybrid drive system of a vehicle having an internal combustion engine and a second drive unit, comprising:
   dragging, by the second drive unit, the internal combustion engine in a specified operating state; and
   ascertaining at least one learned value in the specified operating state.

2. The method as recited in claim 1, wherein the second drive unit is at least one electric motor.

3. The method as recited in claim 1, wherein the internal combustion engine does not contribute to the propulsion of the vehicle in the specified operating state.

4. The method as recited in claim 1, wherein a minimum activating duration of an injector of the internal combustion engine is ascertained as the at least one learned value.

5. A method for operating a hybrid drive system of a vehicle having an internal combustion engine and a second drive unit, comprising:
   dragging, by the second drive unit, the internal combustion engine in a specified operating state; and
   ascertaining at least one learned value in the specified operating state;
   wherein multiple learned values are ascertained at fixed intervals.

6. A hybrid drive system for a vehicle, comprising:
   an internal combustion engine and an additional drive unit configured to drive the vehicle;
   a coupling arrangement configured to enable the second drive unit to drag the internal combustion engine in a specified operating state; and
   a control unit which ascertains learned values in the specified operating state.

* * * * *

UNITED STATES PATENT AND TRADEMARK OFFICE
CERTIFICATE OF CORRECTION

PATENT NO.       : 8,620,500 B2                                                    Page 1 of 1
APPLICATION NO.  : 12/736325
DATED            : December 31, 2013
INVENTOR(S)      : Becker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 533 days.

Signed and Sealed this
Twenty-second Day of September, 2015

Michelle K. Lee
*Director of the United States Patent and Trademark Office*